(12) United States Patent
Murrish et al.

(10) Patent No.: US 8,533,946 B2
(45) Date of Patent: Sep. 17, 2013

(54) METHOD OF MANUFACTURING A CRANKSHAFT

(75) Inventors: Dale Edward Murrish, Troy, MI (US); Mark Helmle, St. Clair Shores, MI (US); Keith Hart, Oakland Township, MI (US); Maurice G. Meyer, Defiance, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/472,011

(22) Filed: May 15, 2012

(65) Prior Publication Data

US 2013/0152731 A1    Jun. 20, 2013

Related U.S. Application Data

(60) Provisional application No. 61/570,511, filed on Dec. 14, 2011.

(51) Int. Cl.
 *B21K 1/08* (2006.01)
 *F16C 3/04* (2006.01)

(52) U.S. Cl.
 USPC .......... 29/888.08; 29/527.6; 29/6.01; 74/595; 164/30; 164/132; 164/465

(58) Field of Classification Search
 USPC ....... 29/888.01, 888.08, 527.6, 6.01; 74/595, 74/605; 164/461, 465, 98, 100, 112, 270.1
 See application file for complete search history.

(56) References Cited

U.S. PATENT DOCUMENTS

| | | | | |
|---|---|---|---|---|
| 4,817,257 A | * | 4/1989 | Mascarenas | 29/888.08 |
| 4,829,642 A | * | 5/1989 | Thomas et al. | 29/888.08 |
| 5,129,444 A | * | 7/1992 | Bafford | 164/112 |
| 2007/0193405 A1 | * | 8/2007 | Shibano et al. | 74/596 |

\* cited by examiner

*Primary Examiner* — Alexander P Taousakis
(74) *Attorney, Agent, or Firm* — Quinn Law Group, PLLC

(57) ABSTRACT

A crankshaft is cast in a mold to define a plurality of pin bearing journals and a plurality of main bearing journals, at least one of each has a hollow section extending therethrough. A single core is positioned within the mold to form all of the hollow sections. The single core may include a cross-section defining an elliptical shape to form hollow sections having an elliptical cross-sectional shape to further reduce the weight of the crankshaft. The hollow sections are each positioned along a path that minimizes stress within the crankshaft. The path may include a non-linear path relative to a longitudinal axis of the crankshaft or a linear path angled relative to the longitudinal axis to bend or direct the hollow sections away from high stress regions of the crankshaft. The non-circular cross section of the core may spiral about its own axis to maximize mass reduction.

9 Claims, 4 Drawing Sheets

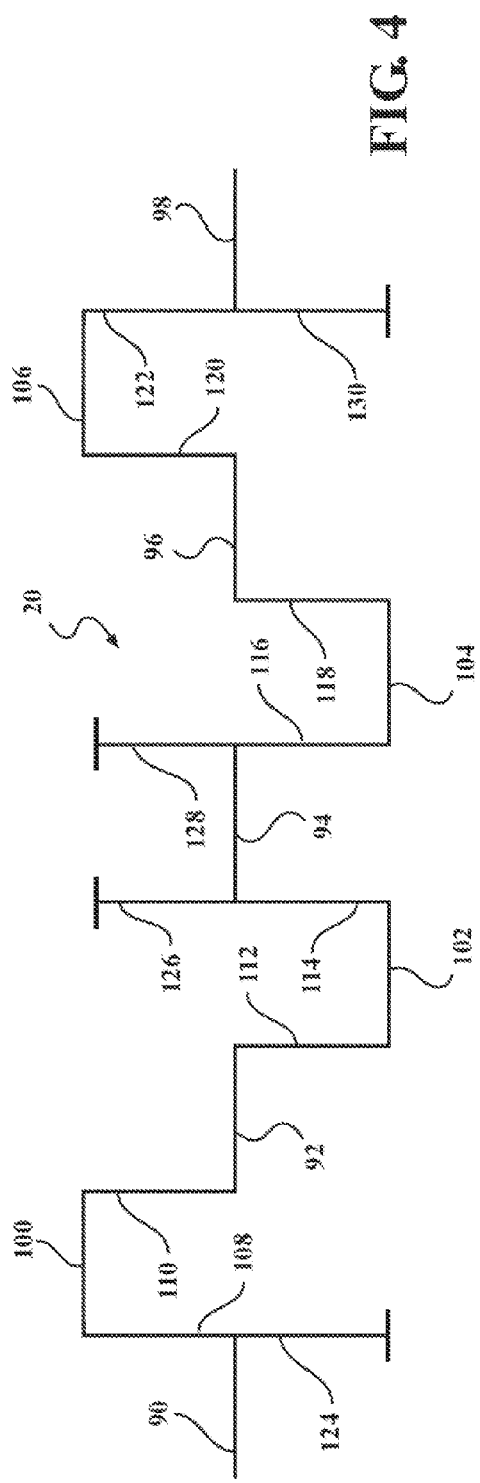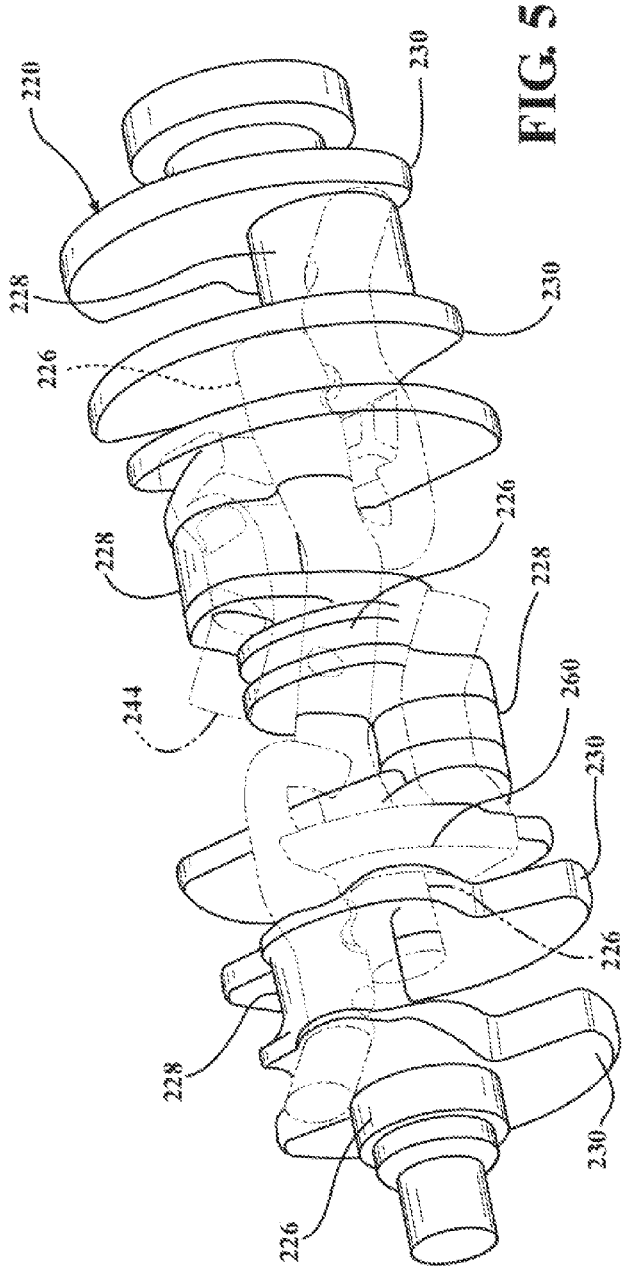

METHOD OF MANUFACTURING A CRANKSHAFT

CROSS-REFERENCE TO RELATED APPLICATIONS

This application claims the benefit of U.S. Provisional Patent Application Ser. No. 61/570,511, filed on Dec. 14, 2011, the disclosure of which is hereby incorporated by reference.

TECHNICAL FIELD

The invention generally relates to a crankshaft, and more specifically to a method of manufacturing a crankshaft.

BACKGROUND

An engine's crankshaft converts reciprocating linear movement of a piston into rotational movement about a longitudinal axis to provide torque to propel a vehicle, such as but not limited to a train, a boat, a plane, or an automobile. Crankshafts are a vital part of an engine, and are a starting point of engine design. Crankshaft design affects the overall packaging of the engine, and thereby the total mass of the engine. Accordingly, minimizing the size and/or mass of the crankshaft reduces the size and mass of the engine, which has a compounding affect on the overall size, mass and fuel economy of the vehicle.

The crankshaft includes at least one crankpin that is offset from the longitudinal axis, to which a reciprocating piston is attached via a connecting rod. Force applied from the piston to the crankshaft through the offset connection therebetween generates torque in the crankshaft, which rotates the crankshaft about the longitudinal axis. The crankshaft further includes at least one main bearing journal disposed concentrically about the longitudinal axis. The crankshaft is secured to an engine block at the main bearing journals. A bearing is disposed about the main bearing journal, between the crankshaft and the engine block.

In order to reduce weight of the crankshaft, a hollow section may be formed into and extend through each of the crankpins and main bearing journals. The crankshaft is typically formed or manufactured by a casting process, such as but not limited to a green sand casting process or a shell mold casting process. Any hollow sections formed into the crankpins and/or the main bearing journals are defined by a plurality of different cores that are placed within the mold during the casting process. Each of these different cores must be precisely positioned relative to each other and the mold to properly form the hollow sections in the appropriate locations.

SUMMARY

A method of manufacturing a crankshaft for an engine is provided. The method includes forming a first half and a second half of a mold to define a cavity therebetween. The cavity forms an exterior shape of the crankshaft. The exterior shape of the crankshaft includes a plurality of pin bearing journals and a plurality of main bearing journals. A single core is positioned within the cavity between the first half and the second half of the mold. Molten metal is introduced into the cavity to form the crankshaft. The molten metal flows into the cavity and around the single core to simultaneously form a hollow section extending through at least one of the plurality of pin bearing journals and at least one of the plurality of main bearing journals.

A crankshaft for an engine is also provided. The crankshaft includes a shaft having a plurality of main bearing journals and a plurality of pin bearing journals. At least one of the main bearing journals and at least one of the pin bearing journals includes a hollow section extending therethrough. Each of the hollow sections in the main bearing journals and the pin bearing journals is simultaneously formed by a single core during a casting process. Each of the hollow sections in the main bearing journals and the pin bearing journals extends along a path relative to a longitudinal axis of the shaft to minimize stresses within the shaft.

Accordingly, all of the hollow sections in the pin bearing journals and the main bearing journals are formed from a single core. Accordingly, the single core only needs to be properly positioned relative to the mold to automatically position all of the hollow sections relative to each other and the mold, thereby improving dimensional accuracy of the hollow sections and improving manufacturing efficiency of the crankshaft.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic diagram of the crankshaft.

FIG. 5 is a schematic perspective view of an alternative embodiment of a cast crankshaft with a single non-planar core still attached thereto.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
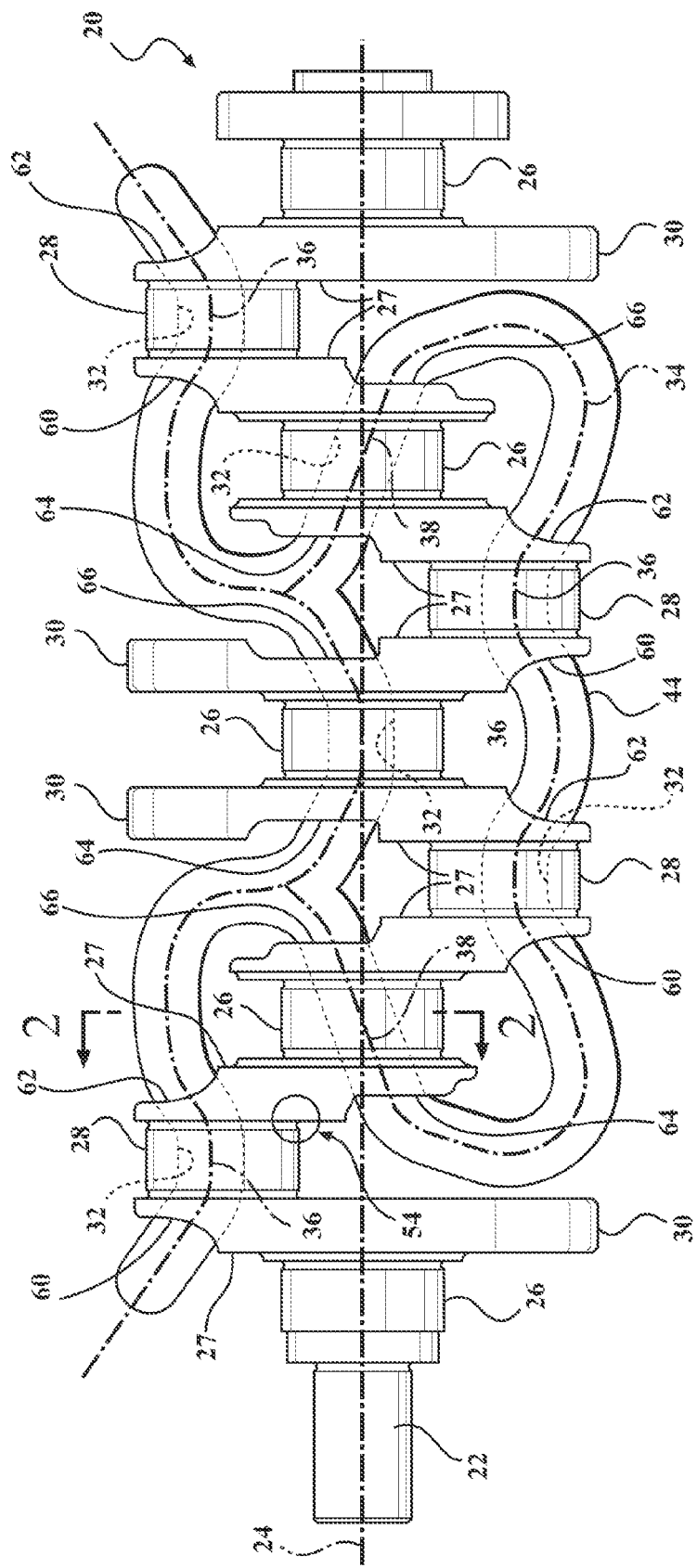
FIG. 1 is a schematic plan view of a cast crankshaft with a single core still attached thereto.

Referring to the Figures, wherein like numerals indicate like parts throughout the several views, a crankshaft is generally shown at 20. Referring to FIG. 1, the crankshaft 20 may be configured for an engine, such as but not limited to a gasoline engine or a diesel engine, a compressor, or some other similar device. The crankshaft 20 includes a shaft 22 extending along a longitudinal axis 24 that defines a plurality of main bearing journals 26, a plurality of arms 27, a plurality of pin bearing journals 28, and at least one counterweight 30.

The main bearing journals 26 are disposed concentrically about the longitudinal axis 24. Each of the pin bearing journals 28 is laterally offset from the longitudinal axis 24, and is attached to the main bearing journals 26 by an arm. Each of the arms extends from one of the main bearing journals 26 to one of the pin bearing journals 28, and may or may not include one of the counterweights 30. Each of the counterweights 30 extends radially away from the longitudinal axis 24. Each of the main bearing journals 26 support a bearing (not shown) thereabout, and provide an attachment location for attaching the crankshaft 20 to an engine block (not shown). Each of the pin bearing journals 28 support a bearing (not shown) thereabout, and provide the attachment point to which a connecting rod (not shown) attaches a piston (not shown) to the crankshaft 20. The counterweights 30 offset the reciprocating mass of the pistons, piston rings, piston pins and retaining clips, the small ends of the connecting rods, the rotating mass of the connecting rod large ends and bearings, and the rotating mass of the crankshaft itself (the pin bearing journals 28 and the arms 27). The main bearing journals are on the crankshaft axis 24 and do not require any counterweights. The counterweights 30 reduce the forces acting on the main bearing journals and thereby improve the durability of the bearings. The counterweights 30 balance the rotation of the crankshaft 20 about the longitudinal axis 24 to reduce vibration therein.

The embodiment of the crankshaft 20 shown in FIG. 1 is for an inline four cylinder engine, and includes four pin bearing journals 28, eight arms 27, five main bearing journals 26, and four counterweights 30. Referring to FIG. 4, the exemplary embodiment of the crankshaft 20 shown in FIG. 1 is shown schematically to include the five main bearing journals 26 numbered 90, 92, 94, 96 and 98 respectively; the four pin bearing journals 28 numbered 100, 102, 104, 106 respectively; the eight arms numbered 108, 110, 112, 114, 116, 118, 120 and 122 respectively; and the four counterweights 30 numbered 124, 126, 128 and 130 respectively. As shown, counterweight 124 is attached to and extends from arm 108, counterweight 126 is attached to and extends from arm 114, counterweight 128 is attached to and extends from arm 116, and counterweight 130 is attached to and extends from arm 122. However, it should be appreciated that the crankshaft 20 may be configured differently than shown in FIGS. 1 and 4. As such, the crankshaft 20 may be configured for any style and/or configuration of engine, including but not limited to a V style engine having six or eight cylinders, or an inline style of engine having 3, 5, 6 or some other number of cylinders. Furthermore, since the arms 27 are structural parts of the crankshaft 20 and the counterweights 30 are merely there to reduce forces and vibrations, the crankshaft 20 may have any number of counterweights 30 attached to the various arms 27 in any configuration. For example, an in-line four cylinder crankshaft may include six or eight counterweights. Accordingly, the specific crankshaft 20 shown in FIGS. 1 and 4, and described herein is merely exemplary, and should not be considered as limiting the scope of the claims.

At least one of the pin bearing journals 28 and at least one of the main bearing journals 26 include a hollow section 32 extending therethrough. Each of the hollow sections 32 in the pin bearing journals 28 and the main bearing journals 26 extends generally along the longitudinal axis 24, as described in greater detail below, but not necessarily parallel to the longitudinal axis 24. Each hollow section 32 that extends through their respective pin bearing journal 28 is formed to extend completely through their respective pin bearing journal 28, between a first axial side 60 of their respective pin bearing journal 28 and a second axial side 62 of their respective pin bearing journal 28 along the longitudinal axis 24 of the crankshaft 20. Similarly, each hollow section 32 that extends through their respective main bearing journal 26 is formed to extend completely through their respective main bearing journal 26, between a first axial side 64 of their respective main bearing journal 26 and a second axial side 66 of their respective main bearing journal 26 along the longitudinal axis 24 of the crankshaft 20. The hollow sections 32 in the crankshaft 20 reduce the volume of metal used to form the crankshaft 20, thereby reducing the overall weight of the crankshaft 20. Furthermore, by reducing the weight of the pin bearing journals 28, which are laterally offset from the longitudinal axis 24, the mass of the counterweights 30 may also be reduced a corresponding amount, thereby further reducing the overall weight of the crankshaft 20.

Each of the hollow sections 32 extends along a path 34 relative to the longitudinal axis 24 of the shaft 22. The path 34 of each of the hollow sections 32 is configured to minimize stresses within the shaft 22, between the various components thereof, i.e., between the adjoining main bearing journals 26, the pin bearing journals 28 and the arms 27. The path 34 of the hollow sections 32 may include a non-linear path, such as shown at 36 designed to bend the hollow sections 32 away from a high stress region of the crankshaft 20, such as shown at 54, or may include a linear path such as shown at 38 angled relative to the longitudinal axis 24 to angle the hollow section 32 away from the high stress regions 54 of the crankshaft 20. The specific path 34 of each of the hollow sections 32 in the pin bearing journals 28, and the main bearing journals 26, and the cross sectional shape of each of the hollow sections 32 is dependent upon the specific shape, size, and configuration of the crankshaft 20.

Figure 2:
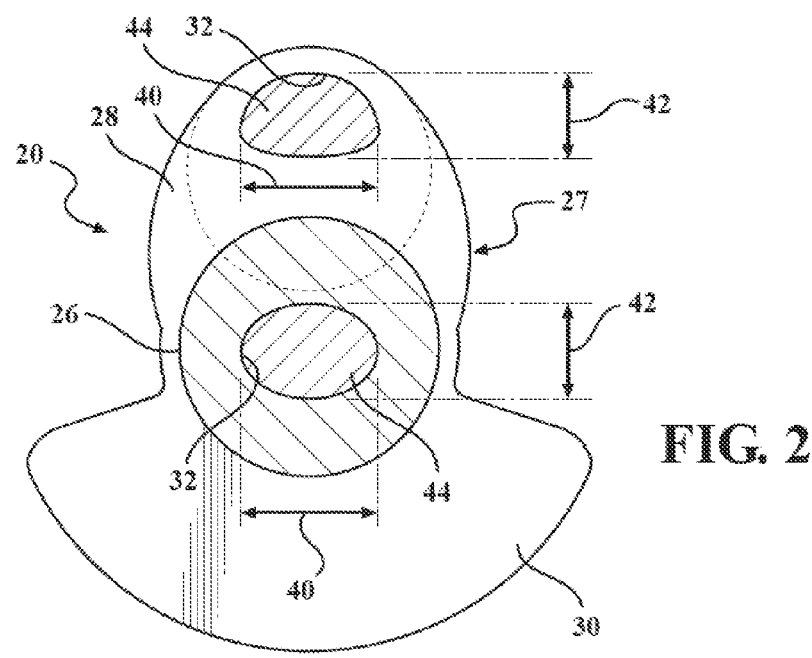
FIG. 2 is a schematic cross sectional view taken along cut line 2-2 shown in FIG. 1 showing a cross sectional shape of the single core and the resulting hollow section in the cast crankshaft.

Referring to FIG. 2, each of the hollow sections 32 includes a cross section defining a shape. The cross sectional shape of each of the hollow sections 32 may include but is not limited to a non-circular shape. As shown in FIG. 2, the cross sectional shape of the hollow sections 32 includes an elliptical shape. The elliptical cross sectional shape of each of the hollow sections 32 includes a major axis 40 and a minor axis 42. The major axis 40 preferably includes but is not limited to a distance between the range of 25 mm and 40 mm. The minor axis 42 preferably includes but is not limited to a distance between the range of 15 mm. and 35 mm. The elliptical shape of the hollow sections 32 maximizes the reduction in material used to form the crankshaft 20, thereby maximizing the reduction in weight thereof.

Referring back to FIG. 1, each of the hollow sections 32 in each of the plurality of main bearing journals 26 and each of the pin bearing journals 28 is simultaneously formed by a single core 44 during a casting process. The single core 44 is formed to extend through each of the pin bearing journals 28 and the main bearing journals 26 at the precise location of the hollow sections 32 thereof, without interfering or otherwise contacting the other sections of the shaft 22, such as but not limited to the counterweights 30.

Figure 3:
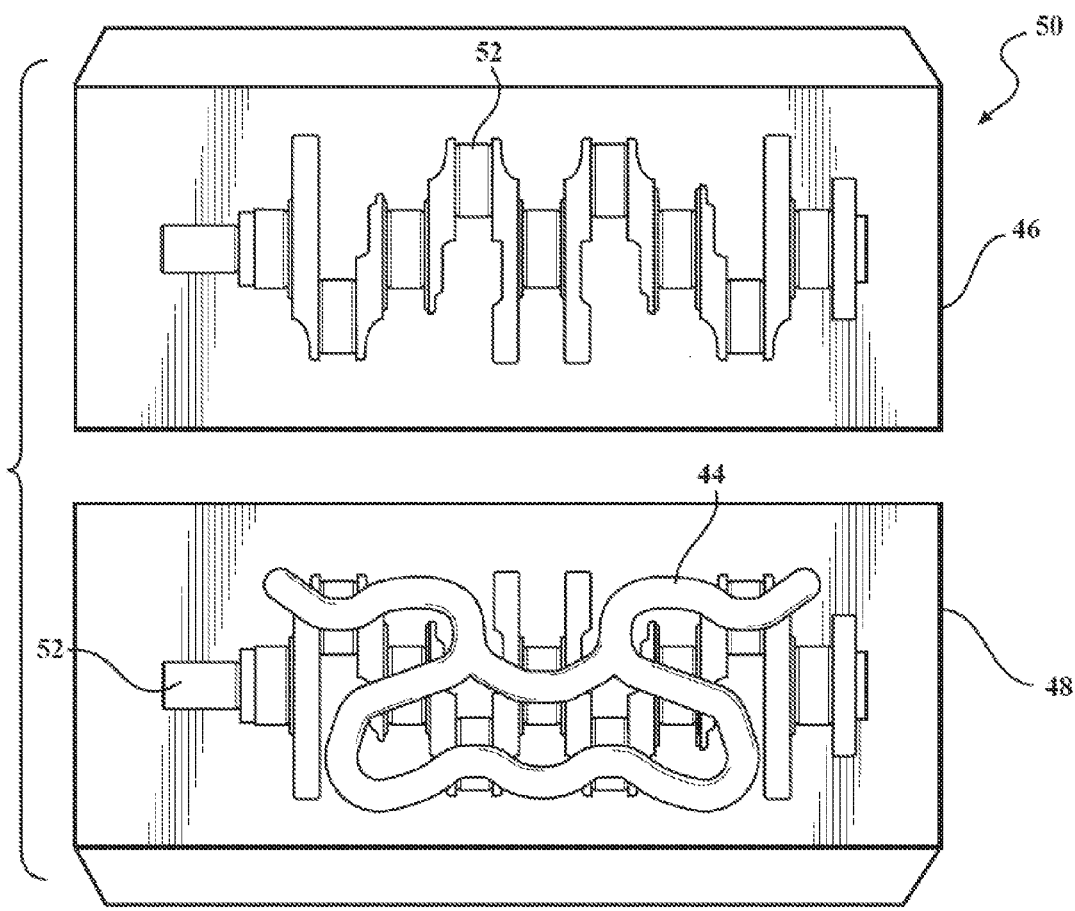
FIG. 3 is a schematic plan view of a mold for casting the crankshaft with a single core disposed therein.

Preferably, the crankshaft 20 is formed through a casting process, such as but not limited to a green sand casting process or a shell mold casting process, as generally understood. As such, referring to FIG. 3, manufacturing or casting the crankshaft 20 includes forming a first half 46 and a second half 48 of a mold 50 to define a cavity 52 therebetween forming an exterior shape of the crankshaft 20. The first half 46 may be referred to as a cope or upper half, and the second half 48 may be referred to as a drag or lower half. As is generally understood, the first half 46 and the second half 48 of the mold 50 may be formed by pressing a template defining half of the desired finished exterior shape of the crankshaft 20 into a form of green sand or some other suitable medium, thereby leaving a negative imprint of that half of the crankshaft 20 therein. Upon combining the first half 46 and the second half 48 together to form the mold 50, the negative imprints therein adjoin to complete the cavity 52 and define the exterior shape of the crankshaft 20. The exterior shape of the crankshaft 20 includes the pin bearing journals 28, the arms 27, the main bearing journals 26, and the counterweights 30. As shown in FIG. 1, the crankshaft 20 includes four pin bearing journals 28, eight arms 27, five main bearing journals 26, and four counterweights 30. Accordingly, the first half 46 and the second half 48 of the mold 50 are formed to define a cavity 52 that forms the four pin bearing journals 28, the five main bearing journals 26, four webs with counterweights 30, and four webs without any counterweights 30. However, as described above, the specific number of pin bearing journals 28 and main bearing journals 26 may differ from the exemplary embodiment shown and described herein.

As shown in FIG. 1, the single core 44 is formed as a unitary piece to have a shape that passes through at least one of the plurality of pin bearing journals 28 and at least one of the plurality of main bearing journals 26. As shown in FIG. 1, the single core is configured to define a hollow section in all four of the pin bearing journals 28 and three of the main bearing journals 26. The single core 44 may be formed, for example, through a sand molding process as generally understood for forming cores that form voids in castings. The single core 44 may be formed symmetrical about a longitudinal center of the single core 44, thereby making it reversible. This allows the single core 44 to be easily positioned within the mold 50 and aids in error proofing the casting process.

Figure 6:
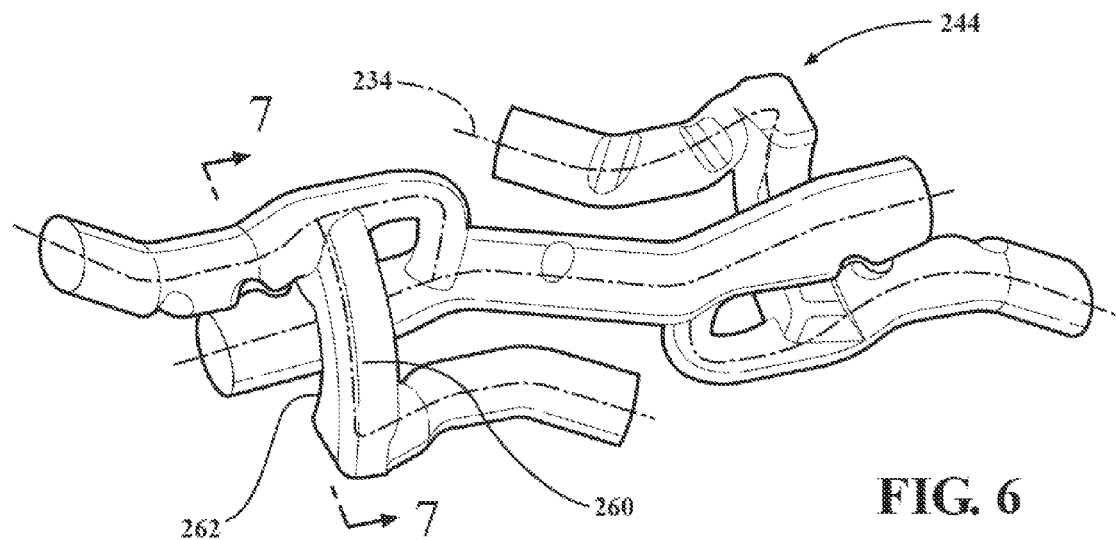
FIG. 6 is a schematic perspective view of the non-planar core.
Figure 7:
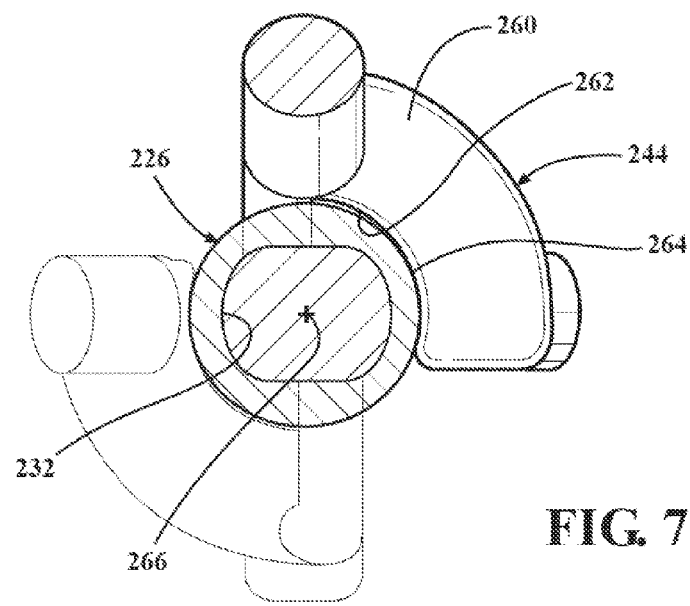
FIG. 7 is a schematic cross section taken along cut line 7-7 shown in FIG. 5.

As shown in FIG. 1, the single core 44 may be formed to include length of material having a circular or non-circular cross section and forming a planar shape. However, in order to use the single core 44 in other engine configurations, the single core 44 may be formed to include a length of material having a circular or non-circular cross section forming a non-planar three dimensional shape, such as shown in FIGS. 5 through 7. Additionally, the single core 44 may be formed as a single unitary member to define or form all of the hollow sections 32 in the main bearing journals 26 and the pin bearing journals 28, without otherwise touching or interfering with the other sections of the crankshaft 20, such as but not limited to the counterweights 30. Alternatively, the single core 44 may be formed in a manner to partially define a portion of the crankshaft 20, such as but not limited to the main bearing journals 26, the pin bearing journals 28, or the counterweights 30.

As shown in FIG. 2, the cross sectional shape of the single core 44 may be formed to define but is not limited to an elliptical shape. The cross sectional shape of the single core 44 may extend along a linear path or a non-linear path, and may alternatively may spiral about a central axis of the cross sectional shape. The cross sectional shape of the single core 44 defines and/or forms the cross sectional shape of the hollow sections 32. As described above, the elliptical shape includes the major axis 40 having a distance between the range of 25 mm and 40 mm, and the minor axis 42 having a distance between the range of 15 mm and 35 mm. The specific cross sectional shape of the single core 44 is dependent upon the specific size, shape and configuration of the crankshaft 20, and is configured to minimize the amount of material used to form the crankshaft 20, while still providing the crankshaft 20 with all required strength and/or stiffness. Accordingly, the cross sectional shape of the core, and the resulting hollow sections 32 defined thereby may differ from the cross sectional shape of the single core 44 shown and described herein.

The single core 44 is formed to define the path 34 that each of the hollow sections 32 extends along. Accordingly, the single core 44 may be formed to define a non-linear path 36 relative to the longitudinal axis 24. The non-linear path 36 may include a curved or non-linear path 36, or a linear angled path 38 that is angled relative to the longitudinal axis 24 as described above. The paths 34 of each of the hollow sections 32 is configured to bend or angle the hollow sections 32 away from high stress regions of the crankshaft 20, thereby retaining as much material around the high stress regions of the crankshaft 20 as possible to improve the strength thereof, while minimizing the weight of the crankshaft 20. For example, a region 54 of the crankshaft 20 between an adjacent main bearing journal 26 and pin bearing journal 28 may be defined as a high stress region 54. As such, the path 34 that the hollow sections 32 follow through either of the adjacent main bearing journal 26 and pin bearing journal 28 directs the hollow section 32 away from the intersection between the adjacent main bearing journal 26 and pin bearing journal 28, thereby maximizing the material in this region 54 to increase the strength of the shaft 22.

Once the single core 44 is properly formed as a single unitary core that defines all of the hollow sections 32 through the main bearing journals 26 and the pin bearing journals 28, the single core 44 is positioned within the cavity 52 between the first half 46 and the second half 48 of the mold 50. Once properly positioned relative to the first half 46 and the second half 48 of the mold 50, the single core 44 is automatically properly positioned to form all of the hollow sections 32 through each of the main bearing journals 26 and the pin bearing journals 28.

Once the single core 44 is positioned within the cavity 52 and the first half 46 of the mold 50 is secured relative to the second half 48 of the mold 50, a molten metal is introduced into the cavity 52 to form the crankshaft 20. The molten metal flows into the cavity 52 and around the single core 44 to simultaneously form each of the hollow sections 32 extending through each of the pin bearing journals 28 and each of the main bearing journals 26. After the molten metal is introduced, e.g., poured, into the cavity 52, the molten metal is allowed to cool and solidify. Once solidified, the first half 46 and the second half 48 of the mold 50 may be separated, thereby exposing the cast crankshaft 20 and the single core 44. The single core 44 may then be removed from the crankshaft 20 by breaking, chipping and/or flushing away the material forming the single core 44, thereby leaving the crankshaft 20 with the hollow sections 32 formed therein.

Because the single core 44 is formed as a single piece that does not contact the crankshaft 20 other than in the locations in which the hollow sections 32 are to be formed, the remainder of the crankshaft 20 is formed without any blind holes, indentations, etc., that may occur in some prior art casting processes that use multiple cores to form the hollow sections 32 in the main bearing journals 26 and the pin bearing journals 28. Accordingly, the mass of the crankshaft 20 may be properly positioned to best maximize the performance and minimize the size of the crankshaft 20.

Referring to FIGS. 5 through 7, an alternative embodiment of a crankshaft is generally shown at 220. The crankshaft 220 is designed for use in a V-8 engine. The crankshaft 220 includes a plurality of main bearing journals 226, a plurality of pin bearing journals 228, and a plurality of counterweights 230. The pin bearing journals 228 of the crankshaft 220 are not disposed along a common plane. As such, a single non-planar core 244 is used to define a plurality of hollow sections in each of the main bearing journals 226 and the pin bearing journals 228.

The single non-planar core 244 includes at least one connecting portion 260. The connecting portion 260 includes a surface that forms at least a portion of one of the main bearing journals 226, one of the pin bearing journals 228, or one of the counterweights 230. This allows a size of the non-planar core 244 to be increased in this region, thereby improving the strength of the non-planar core 244. As best shown in FIG. 7, the connecting portion 260 includes a radially inner surface 262 that forms an exterior surface 264 of one of the main bearing journals 226. However, it should be appreciated that the single non-planar core 244 may be formed to include one or more other connecting portions 260 that form at least a portion of one of the pin bearing journals 228, one of the main bearing journals 226, or one of the counterweights 230.

Referring to FIG. 7, a hollow section 232 of the main bearing journal 226 shown in FIG. 7 is formed to spiral about a center 266 of the hollow section 232. As such, the non-planar core 244 also includes a similar spiral shape to define the spiral path of the hollow section 232 extending through the main bearing journal 226. Such a spiral configuration of the hollow sections 232 allows the minor axis height and distance from the path 234 to be optimized to maximize weight reduction. It should be appreciated that any of the hollow sections in any of the main bearing journals 226 and the pin bearing journals 228 may extend along and spiral about their respective centers.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of manufacturing a crankshaft, the method comprising:
   positioning a single core within a cavity of a mold having a first half and a second half forming an exterior shape of the crankshaft, wherein the exterior shape of the crankshaft includes a plurality of pin bearing journals and a plurality of main bearing journals;
   introducing a molten metal into the cavity to form the crankshaft, wherein the molten metal flows into the cavity and around the single core to simultaneously form a hollow section extending through at least one of the plurality of pin bearing journals and at least one of the plurality of main bearing journals; and
   removing the single core from the cast crankshaft to leave the crankshaft with the hollow sections formed therein;
   wherein the hollow sections extending through the at least one of the plurality of pin bearing journals is formed to extend completely through the at least one of the plurality of pin bearing journals, between a first axial side of the respective pin bearing journal and a second axial side of the respective pin bearing journal along a longitudinal axis of the crankshaft; and
   wherein the hollow sections extending through the at least one of the plurality of main bearing journals is formed to extend completely through the at least one of the plurality of main bearing journals, between a first axial side of the respective main bearing journal and a second axial side of the respective main bearing journal along the longitudinal axis of the crankshaft.

2. A method as set forth in claim 1 further comprising forming the single core as a unitary piece through a sand molding process to have a shape that passes through the at least one of the plurality of pin bearing journals and the at least one of the plurality of main bearing journals.

3. A method as set forth in claim 2 wherein forming the single core is further defined as forming the single core to include a length of material forming a planar shape.

4. A method as set forth in claim 2 wherein forming the single core is further defined as forming the single core to include a length of material forming a non-planar three dimensional shape.

5. A method as set forth in claim 2 wherein forming the single core as a unitary piece includes forming the single core to be symmetrical about a longitudinal center of the core.

6. A method as set forth in claim 2 wherein forming the single core is further defined a forming the single core to include a length of material having a cross section defining a non-circular cross sectional shape.

7. A method as set forth in claim 6 wherein the non-circular cross sectional shape of the single core includes an elliptical shape.

8. A method as set forth in claim 2 wherein forming the single core as a unitary piece to have a shape that passes through the at least one of the plurality of pin bearing journals and the at least one of the plurality of main bearing journals includes forming the single core to define a non-linear path relative to a longitudinal axis of the crankshaft for at least one of the hollow sections extending through at least one of the plurality of pin bearing journals or at least one of the plurality of main bearing journals.

9. A method as set forth in claim 2 wherein forming the single core as a unitary piece includes forming the single core to include at least one connecting portion having a surface that defines at least a portion of one of the main bearing journals, one of the pin bearing journals, or one of a plurality of counterweights.

* * * * *